United States Patent
Praus, II et al.

(10) Patent No.: US 6,707,020 B1
(45) Date of Patent: Mar. 16, 2004

(54) ADAPTIVE DYNAMIC RANGE WAVEFRONT SENSOR

(75) Inventors: Robert W. Praus, II, Albuquerque, NM (US); Daniel Eastman, Albuquerque, NM (US)

(73) Assignee: MZA Associates Corporation, Albuquerque, NM (US)

( * ) Notice: Subject to any disclaimer, the term of this patent is extended or adjusted under 35 U.S.C. 154(b) by 123 days.

(21) Appl. No.: 09/753,321

(22) Filed: Dec. 28, 2000

Related U.S. Application Data

(60) Provisional application No. 60/173,251, filed on Dec. 28, 1999.

(51) Int. Cl.[7] .................................................. G01J 1/20
(52) U.S. Cl. ................................. 250/201.9; 250/208.1
(58) Field of Search ........................... 250/201.1, 201.9, 250/208.1, 216; 356/254

(56) References Cited

U.S. PATENT DOCUMENTS

| | | | |
|---|---|---|---|
| 4,141,652 A | 2/1979 | Feinleib | 356/121 |
| 4,438,330 A | 3/1984 | Hardy | 250/201 |
| 4,490,039 A | 12/1984 | Bruckler et al. | 356/121 |
| 4,518,854 A * | 5/1985 | Hutchin | 356/521 |
| 4,724,404 A | 2/1988 | Cochran | 332/7.51 |
| 4,725,138 A * | 2/1988 | Wirth et al. | 356/121 |
| 4,737,621 A | 4/1988 | Consiorowski et al. | 250/201 |
| 5,146,073 A | 9/1992 | Wirth et al. | 250/201.9 |
| 5,166,508 A * | 11/1992 | Davis et al. | 250/201.9 |
| 5,287,165 A | 2/1994 | Ulich et al. | 356/121 |
| 5,396,364 A * | 3/1995 | O'Meara et al. | 250/209.1 |
| 5,472,759 A * | 12/1995 | Chen et al. | 428/65.1 |
| 5,629,765 A | 5/1997 | Schmutz | 356/121 |
| 5,850,479 A * | 12/1998 | Terry et al. | 382/211 |
| 5,864,381 A | 1/1999 | Neal et al. | 351/205 |
| 5,912,731 A | 6/1999 | DeLong et al. | 356/121 |
| 6,248,988 B1 * | 6/2001 | Krantz | 250/201.3 |

FOREIGN PATENT DOCUMENTS

DE 19800844 A1 * 7/1999 ............. G01J/9/00

* cited by examiner

*Primary Examiner*—Huy Mai
(74) *Attorney, Agent, or Firm*—Jeffrey D. Myers

(57) ABSTRACT

An adaptive dynamic wavefront sensor and corresponding method comprising a spatial light modulator and a lenslet array. A subarray of pixels of the spatial light modulator controls illumination of a lenslet of the lenslet array. The sub-array can operate as a shutter for the corresponding lenslet or to control intensity of a focus of the lenslet.

21 Claims, 6 Drawing Sheets

ADAPTIVE DYNAMIC RANGE WAVEFRONT SENSOR

CROSS-REFERENCE TO RELATED APPLICATIONS

This application claims the benefit of the filing of U.S. Provisional Patent Application Serial No. 60/173,251, entitled "Adaptive Dynamic Range Wavefront Sensor", filed on Dec. 28, 1999, and the specification thereof is incorporated herein by reference.

GOVERNMENT RIGHTS

The U.S. Government has certain rights in this invention as provided for by the terms of Contract No. F29601-98-C-0114 awarded to MZA Associates Corporation by the United States Air Force Research Laboratory.

BACKGROUND OF THE INVENTION

1. Field of the Invention (Technical Field)

The present invention relates to wavefront and surface metrology employing a Hartmann sensors.

2. Background Art

For a number of years, there has been growing interest In the application of Hartmann sensors to wavefront metrology. Several applications are in areas that have historically been dominated by interferometric techniques. In particular, the use of interferometers to fabricate multi-meter size optics requires extensive metrology tooling costs that can exceed the costs to grind and polish the large optical components. The interferometric technology becomes increasingly difficult when one considers the fabrication and deployment of multi-segmented or membrane mirrors of the type that are now being considered for the Next Generation Space Telescope (NGST).

The adjustment of the six degrees of freedom of each segment of a multi-mirror usually requires several metrology schemes to cover the dynamic range. The initial departure from final figure shape may be several millimeters of inaccuracy, yet the final error must be as small as a few percent of the operational wavelength. This large dynamic range of measuring slope error should be possible in a single instrument so that an actuation system can be used to reduce the surface error to within a fraction of a wave of the desired shape.

Membrane mirrors have unique properties that mandate a new approach to measuring their surfaces. There are large amounts of 3rd and 5th order spherical aberration and the radius of curvature is also a variable. Membrane mirrors are very susceptible to acoustical disturbances that are exacerbated by the low mass, lack of damping and high stresses that give the mirror all of the characteristics of a drumhead.

For these applications, interferometers that measure optical path differences are inadequate. They need to operate near null, resulting in a low dynamic range to measure either surface figure or slope errors, cannot operate when the vibrational motion approaches the effective wavelength, and require considerable time to acquire sufficient data to give repeatable results.

Conventional Hartmann tests using an array of lenslets to sample the local tilts are much more applicable, since moderate amounts of vibration and turbulence can be averaged. The Hartmann system does not require a coherent source, and does not have the $2\pi$ ambiguity of optical path difference associated with interferometric techniques. The problem with conventional Hartmann systems is that when one increases the dynamic range there is a commensurate decrease in accuracy and/or sampling density. The present invention presents a solution to all of the metrology applications in the above paragraphs while at the same time overcomes the limitations inherent in a conventional Hartmann instrument.

SUMMARY OF THE INVENTION (DISCLOSURE OF THE INVENTION)

The present invention is of an adaptive dynamic wavefront sensor (and corresponding method) comprising: a spatial light modulator, and a lenslet array. In the preferred embodiment, a sub-array of pixels of the spatial light modulator controls illumination of a lenslet of the lenslet array. In one embodiment, the sub-array operates as a shutter for the lenslet, preferably selectively illuminating a subset of all lenslets of the lenslet array. This embodiment can be employed to increase the dynamic range of the sensor by allowing each lenslet focus to occupy a larger area of a detection device, to sample a wavefront at a variable density of points and frequencies to adaptively determine an optimal scan rate and scan configurations, or to adaptively change temporal frequency to quantify vibration amplitudes and modes. In another embodiment, the sub-array operates to control intensity of a focus of the lenslet. This embodiment can be employed to improve signal-to-noise ration, to change an effective f-number of the lenslet, or to apodize illumination of the lenslet to control aberration content of the beam from the lenslet.

The invention is also of an adaptive dynamic wavefront sensor (and corresponding method) comprising: a polarizer; pupil relay lenses; a spatial light modulator; a lenslet array; a CCD camera receiving light from the lenslet array; and a polarizing beam splitter receiving incoming light from the polarizer on one side and from the spatial light modulator on another side and sending light to the spatial light modulator on one side and to the lenslet array through the pupil relay lenses on another side.

A primary object of the present invention is provide an adaptive dynamic range wavefront sensor and method that can Individually control the apodization and intensity of light incident on a lenslet array of a Hartmann sensor.

A primary advantage of the present invention Is that it can be employed to simultaneously shutter a plurality of lenslets of the array or to selectively control illumination intensity and apodizaton of one lenslet or a plurality of lenslets.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Best Modes for Carrying out the Invention

The present invention is of an adaptive dynamic range wavefront sensor and method using a spatial light modulator to individually control the intensity of light incident on each lenslet array of a Hartmann sensor. The optical layout is configured so that both the spatial light modulator ("SLM") and the pupil of the test optic are imaged on to the lenslet array. The magnification of the pupil image is chosen so that a sub-array of SLM pixels is used to control the illumination on one lenslet.

There are two modes of operation of the SLM. In the first mode the SLM sub-array is operated as a unit to be a simple shutter for each lenslet. In this mode the SLM is used to: (1) selectively illuminate at any instant a fraction of the lenslets in the array. The subarrays are then scanned in serial mode so that data from all of the lenslets can be obtained. The selective real time ability to shutter the illumination on each lenslet is then employed to: (2) increase the dynamic range by allowing each lenslet focus to unambiguously occupy a larger segment of the detector array while still preserve the precision of the local slope error; (3) sample the wavefront with variable spatial configurations variable number of instantaneous sub-arrays and varying frequencies to adaptively determine the optimal scan rate and scan configurations, with the actual scan scenario being determined by using optimization algorithms of selected criteria to adaptively change the sampling parameters; and (4) adaptively change the temporal frequency of the scans to quantify vibration amplitudes and modes. In one embodiment, the lenslet arrays are densely packed within the pupil to obtain tilt information over tens of thousands of sub apertures and imaged on conventional detectors. Selective scanning through the whole array allows one to adjust the dynamic range to values appropriate to the errors in the test wavefront and obtain that information with spatial content exceeding 200×200 points.

The second mode of operation controls the individual SLM pixels in each sub-array to: (5) remove focus in the lenslet beam as an internal mode of self-calibration; (6) control the intensity of the lenslet foci to improve signal to noise; (7) control the aberration content; and (8) change the effective f-number of each lenslet.

The present invention has applications to optical surface metrology of mirrors and lenses, the static and dynamic alignment of optical systems, and the surface characterization of non-optical but transmissive or partially reflective surfaces. It provides a particularly appropriate metrology tool for surfaces or systems whose characterization requires any combination of the following: a) a fixed or adjustable wide dynamic range; b) high spatial and temporal content; and c) wavefront measurement in the presence of vibration or thermal perturbations.

Figure 1:
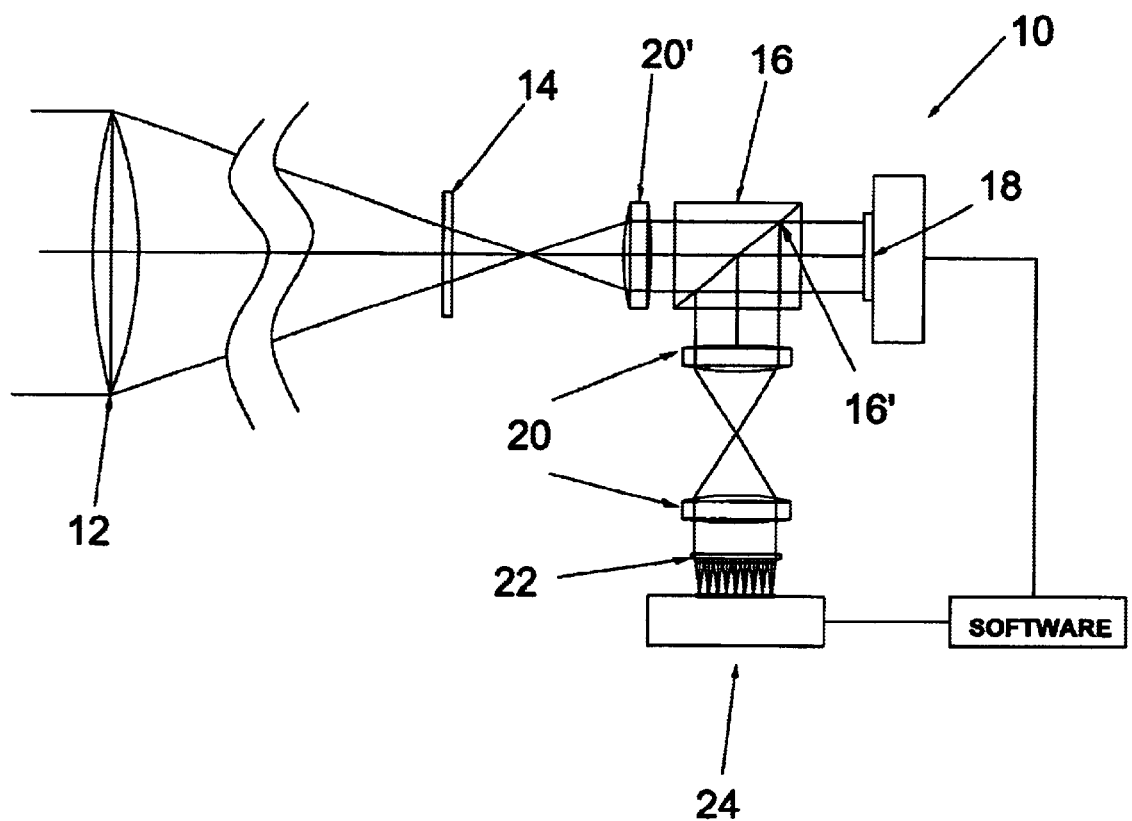
FIG. 1 is a schematic layout of the preferred apparatus of the present invention—the test optic, SLM, and lenslet array are conjugate points.

An optical layout of the preferred apparatus 10 of the invention is shown in FIG. 1. To simplify the layout, the test optic 12 is shown as a refractive optic that is illuminated with collimated laser beam at 0.633 micron wavelength. This does not represent a limitation of the applicability of the invention, for in actual use the test wavefront could be generated as a reflected or transmitted wavefront using a coherent or incoherent source through any optical system. The test optic 12 is preferably mounted on a stage (not shown) so several degrees of freedom of the lens alignment can be adjusted independently of one another, or employed with other known means of achieving such freedom. The polarizer 14 is preferably rotatable so that it can control the intensity of the light transmitted by the polarizing beam splitter cube 16 ("PBSC").

The first relay lens 20' collimates the beam through the PBSC 16 and images the test object or entrance pupil on to the SLM 18. The SLM 18 is an array of any number of pixels (such as 256×256 pixels) and is preferably a reflecting SLM 18. On a pixel by pixel basis the SLM 18 can be electrically addressed to induce a half wave plate into the beam. The plane of polarization of the reflected beam from each electronically addressed pixel is thus rotated by 90 degrees and these beams are reflected off the hypotenuse 16' of the PBSC 16 to the two pupil relay lenses 20. This lens combination images the SLM 18 on to the lenslet array 22 with unit magnification and maintains collimation of the beam. The foci formed by the array of lenslets 22 are imaged on to the CCD array 24. A sub-array of SLM pixels (such as 12×12) serves as an electronic shutter for each lenslet.

The second mode of operation uses the SLM to selectively illuminate a pattern of lenslets. With a sparse pattern, the area of the CCD per lenslet increases. The resultant increase in dynamic range is compared schematically to a conventional Hartmann wavefront sensor in FIG. 2.

Figure 2:
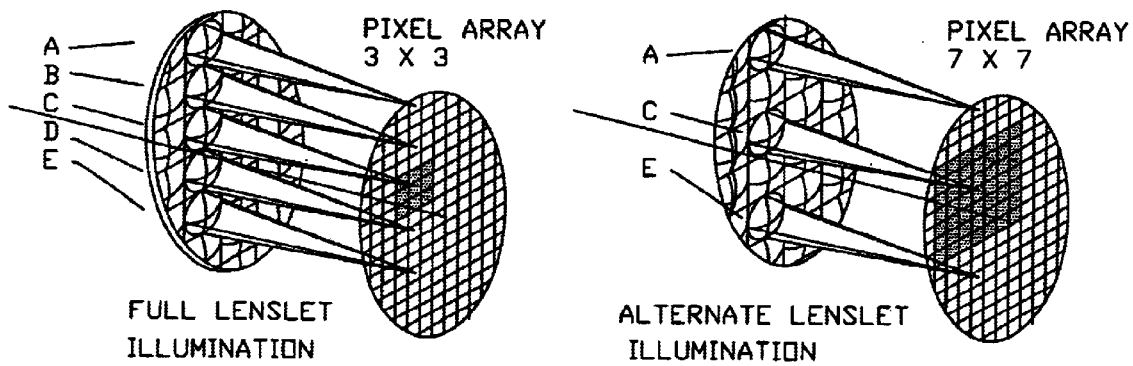
FIG. 2 is a one-dimensional configuration as an illustration of the increase in dynamic range from the conventional scheme shown on the left to that of the present invention shown on the right with selective illumination of the lenslet array.

The conventional Hartmann sensor illuminates all of the lenslets as indicated in the left drawing in FIG. 2. For clarity only a single column Is shown and lenslets A through E form a row of foci on the CCD array. The number of pixels available to each lenslet is a direct expression of the dynamic range. Each lenslet unambiguously addresses any one of nine pixels on the CCD. The effective range of tilt that can be accommodated is then equivalent to the number of pixels available to the focus from each lenslet.

The invention's process array allows one to increase the number of pixels available to any lenslet. In one mode the SLM electronically addresses the sub-array of SLM pixels to open at any instant a limited number of the lenslets. This is shown in the right section of FIG. 2 where each lenslet foci may lie within a 7×7 CCD pixel array. Successive scans of the SLM to illuminate the entire lenslet array can be accomplished to maintain the spatial information content. This allows one to adapt the dynamic range to accommodate the slope errors unique to the alignment or wavefront of any the test optic. The SLM can be programmed to handle large amounts of tilt, or power or spherical aberration. In a second mode the SLM is programmed so that the sub-array of SLM pixels for any lenslet is programmed to apodize or change the illumination on each lenslet. This mode is used to control intensities or to individually change the f-number of a lenslet. At each scan of the lenslet array, known algorithms are applied to compute the centration coordinates of the foci and to extract the relative tilt at each lenslet. These in turn are used to best fit the slopes to an orthogonal set of aberrations that can be directly interpreted as classical aberrations within the system.

The preferred embodiment of the invention is shown in FIG. 1. In this embodiment the SLM is used in a reflective mode. The sub-array of SLM pixels (such as 12×12) is used to control the illumination of each lenslet or to apodize the subapertures to control aberrations within the lenslet subaperture.

Other embodiments of the invention would employ any one or combinations of the following modes and features:

Addition of error minimizing and data optimizing software to automatically adjust the SLM patterns in spatial and temporal space;

Real time SLM operation to compensate for real time fluctuations in sub aperture tilts;

A real time adjustable data acquisition frequency mode to obtain slope data at the extremes of the vibrational antinodes to determine vibrational mode frequencies and amplitudes in devices such as membrane mirrors;

A real time adjustable data acquisition frequency mode to minimize vibration effects and obtain only average slope errors;

SLM devices In transmissive mode;

An SLM transmissive device mechanically coincident with the lenslet array;

Use of a single pixel of the SLM to control a single lenslet leading to spatial data in arrays of 256×256 and higher;

Apodization of the SLM to normalize wavefront intensities over the entrance pupil—this would be applied to systems with wide temporal or spatial variations in sub-aperture intensities as seen in turbulent liquid or gaseous media or to quantify the surface slope errors in a meniscus mirror with large amounts of residual power or tilt;

Variable plateau cut-offs to isolate and quantify specular properties in the presence of lambertian or scattering background—this configuration could be applied to partially ground or generated surfaces, or to surfaces that have been machined, painted, or otherwise treated so that there is a specular component to the reflected light;

Use of incoherent sources to quantify chromatic tilt effects;

One dimensional SLM, lenslet and camera arrays to interrogate surfaces that are cylindrical or linear, or to test in situ or during fabrication or to acquire data at higher rates; and Use of incoherent or multi wavelength sources to isolate or quantify profiles of surfaces that are wavelength dependent such as lithographic or grating type surface patterns.

INDUSTRIAL APPLICABILITY

The invention is further illustrated by the following non-limiting examples.

EXAMPLE 1

Figure 3:
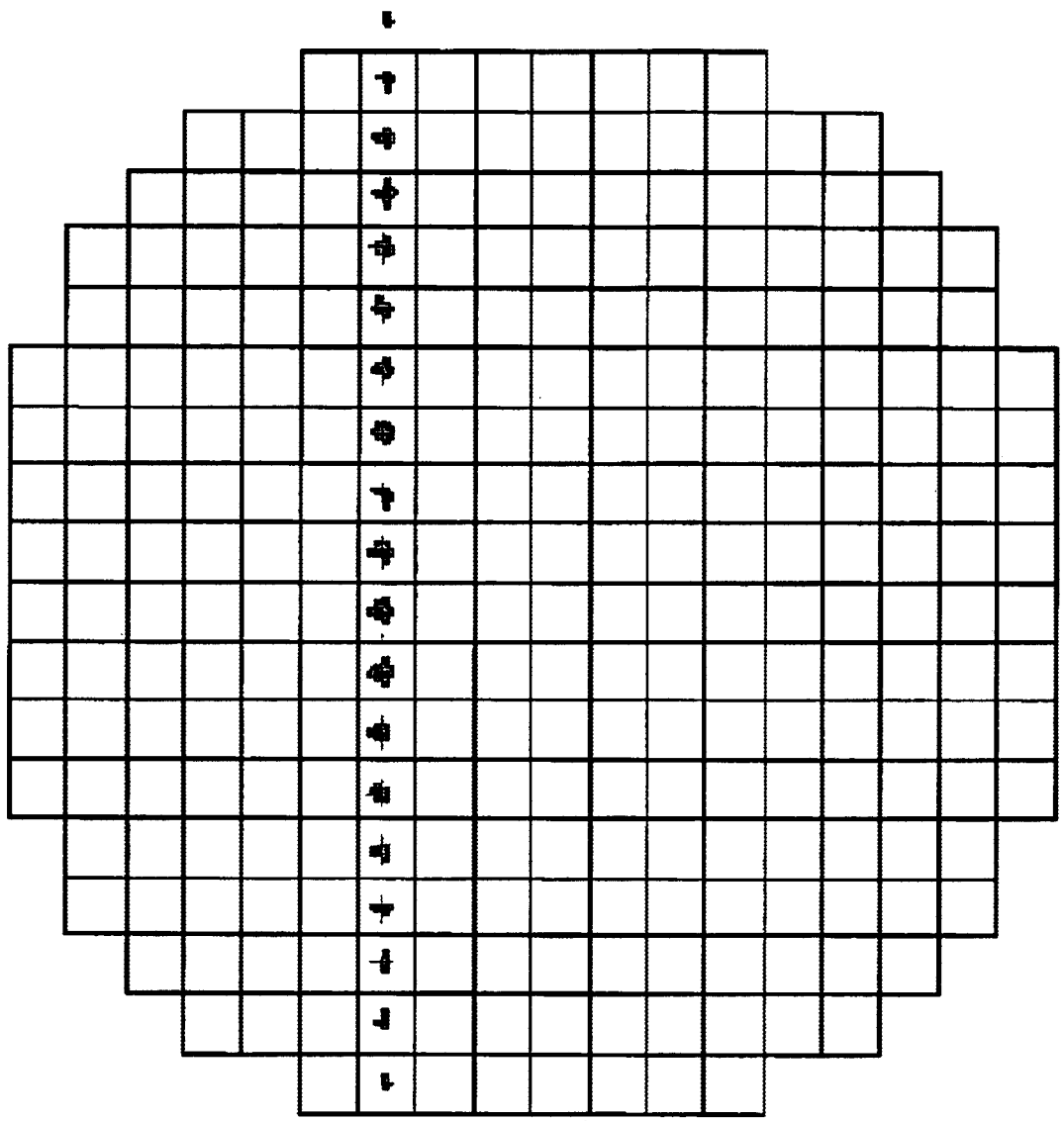
FIG. 3 shows an actual line of foci from the seventh row of lenslets of Example 1.

The invention is illustrated using a prototype of the invention to aid in the alignment of an optical system. The first example illustrated is an optical system with extreme tilt about the vertical axis resulting in the presence of slope errors that could not be captured by a conventional instrument. The scan mode chosen is to successively illuminate single rows of lenslets. FIG. 3 shows the actual line of foci from the seventh row of lenslets. The invention also has the capability to zoom into this display and observe the foci of one or more lenses. This feature allows one to verify that the lenslet array is in focus or to observe aberration content within a single lenslet.

Figure 4:
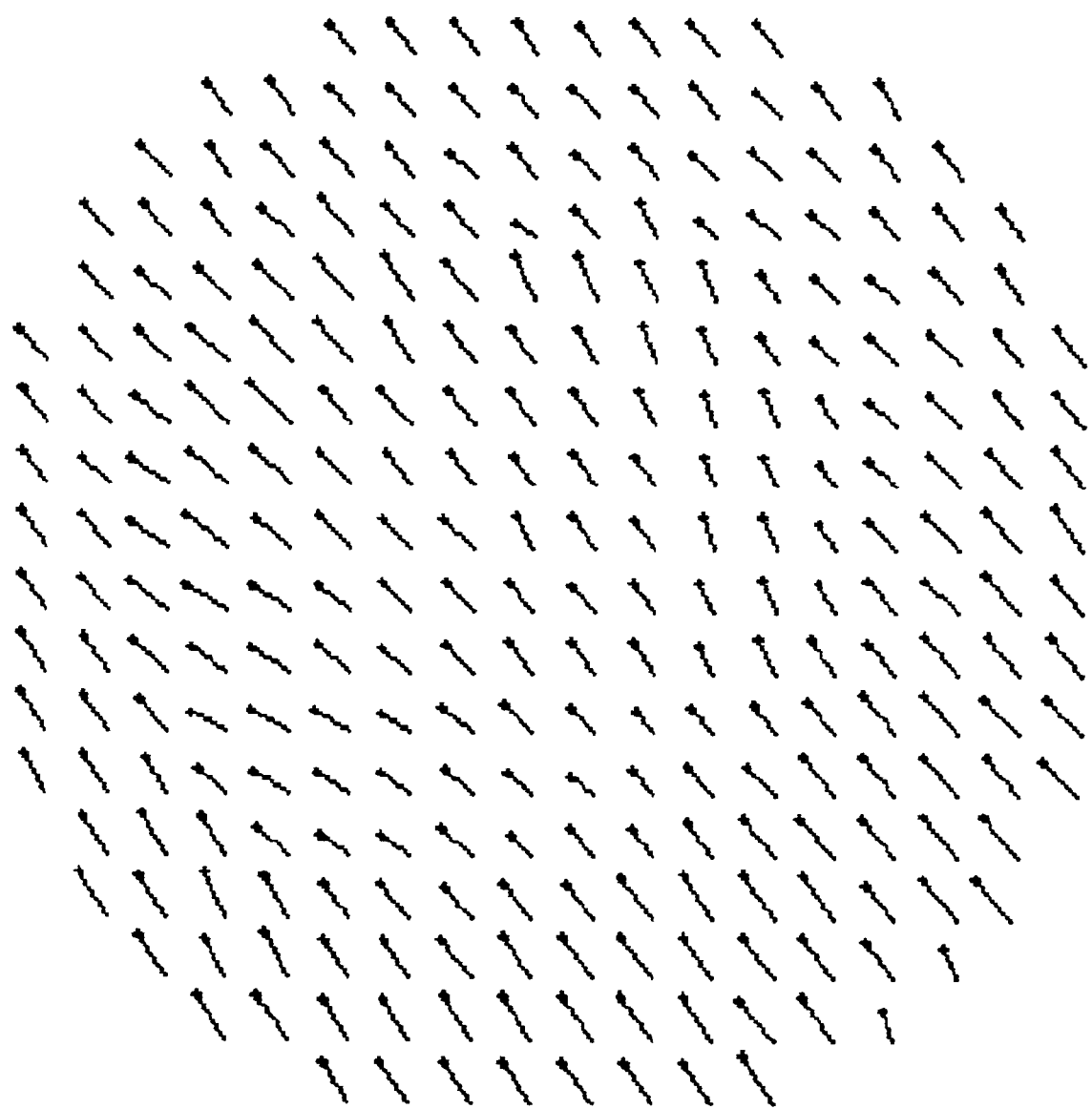
FIG. 4 is a quiver plot of a wavefront of Example 1 with both X and Y tilt present and the resulting Zernike terms.

The presence of tilt can be displayed as a quiver plot where each small circle represents the center of the lenslet foci and the vector shows the magnitude and direction of the local tilt at each lenslet array. FIG. 4 indicates a peak to valley tilt of 18.2 and 15.5 microns in the two axes. The magnitude of the terms Z4 through Z7 shows that there is also both astigmatism and coma present. The quiver plot can graphically show any anomalous values of tilt caused by variations in intensity or excessive dynamic range for the chosen scan mode.

EXAMPLE 2

Figure 5:
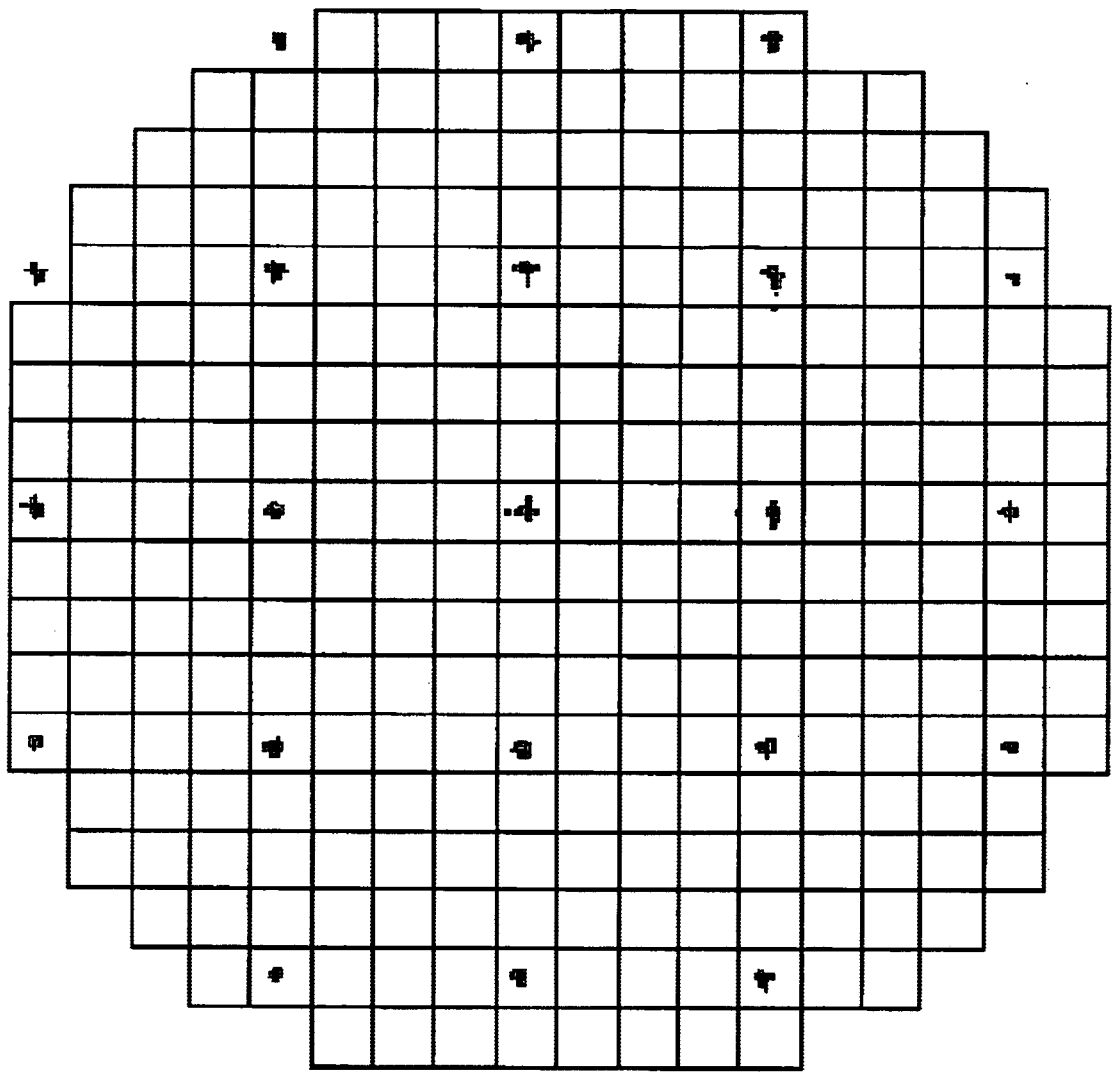
FIG. 5 shows scan mode used in the presence of power in Example 2.
Figure 6:
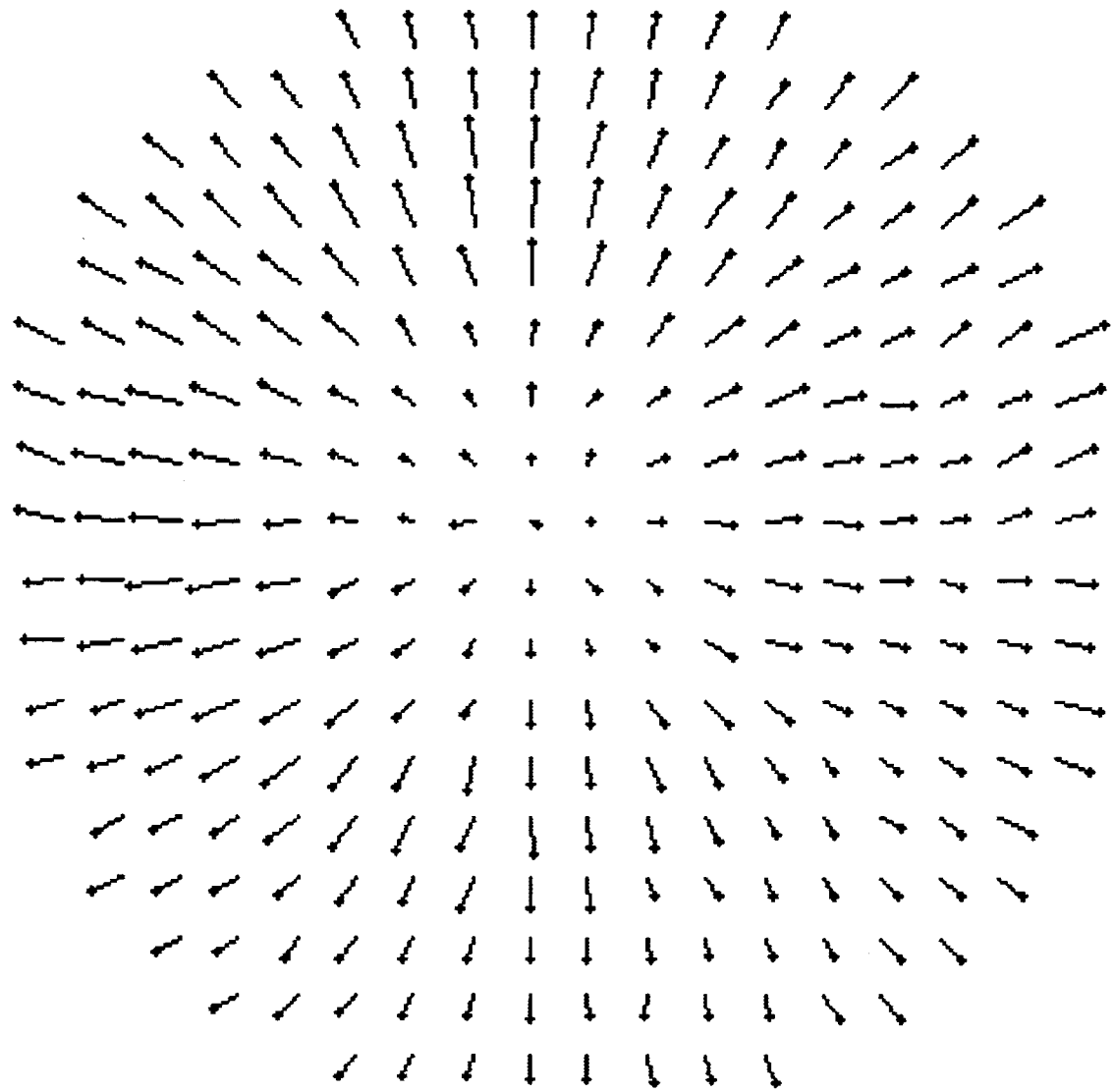
FIG. 6 is a quiver plot in the presence of defocus of the test lens in Example 2—the present invention can acquire power when the local tilt exceeds the conventional dynamic range.

The second example illustrated is an optical system that is not properly focussed. The capability of the invention to successfully acquire data in the presence of defocus is shown in FIGS. 5 and 6. In the presence of this aberration the lenslet arrays are successively scanned over a 4×4 array. This scan mode allows one to acquire the lenslet focus anywhere within a surrounding area equivalent to the angular space subtended by 4×4 lenslets resulting in an increase in the dynamic range. FIG. 5 shows the first illumination of one of the sixteen steps required to scan the whole array. The quiver plot in FIG. 6 indicates that all of the extreme local tilts at the edge of the lens have been acquired. The direction of the vectors indicates that the test lens must be moved toward the device of the invention and the measured defocus determined that the lens should be moved 2.0 mm.

These two examples illustrate the ability of the present invention to acquire data in the presence of large amounts of tilt and power.

FURTHER EXAMPLES

The invention is further illustrated by the following non-limiting examples where the invention is applied to surface measurement during fabrication of optical components:

Quantify the surface slope errors in a meniscus mirror with large amounts of residual power or tilt;

Quantify a wide range of surface errors during the initial fabrication of aspheric surfaces without the need for multiple null lens configurations;

Measure a membrane mirror in the presence of vibration;

Measure surface errors on a surface while still on the generation, grinding or polishing machines, in the presence of vibration;

Quantify optical component surfaces or transmitted wavefronts with spatial frequency slope content equivalent to that obtained using interferometric techniques; and Increase the spatial frequency so that surface errors can be acquired up to a spatial frequency of one to two hundred without decreasing the precision.

The present invention can also be applied to non-optical surfaces that have only a partial reflective component to:

Measure surfaces that are only partially reflective that have been painted, machined, cast or embossed; and Using multi-wavelength or incoherent sources, measure the profiles of complex sources whose surfaces are index or color dependent.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby Incorporated by reference.

What is claimed is:

1. An adaptive dynamic wavefront sensor comprising:
   a spatial light intensity modulator; and
   a lenslet array;
   wherein a sub-array of pixels of said spatial light intensity modulator controls illumination of a lenslet of said lenslet array.

2. The sensor of claim 1 wherein said sub-array operates as a shutter for said lenslet.

3. The sensor of claim 2 wherein said spatial light intensity modulator selectively illuminates a subset of all lenslets of said lenslet array.

4. The sensor of claim 3 wherein dynamic range of said sensor is increased via means for allowing each lenslet focus to occupy unambiguously a larger area of a detection device, thereby permitting measurement of a larger wavefront tilt.

5. The sensor of claim 3 wherein said sensor comprises means for sampling a wavefront at a variable density of points and frequencies to adaptively determine an optimal scan rate and scan configurations.

6. The sensor of claim 3 wherein said sensor adaptively changes temporal frequency comprises means for adaptively changing temporal frequency to quantify vibration amplitudes and modes.

7. The sensor of claim 1 wherein said intensity modulator is operated in such a manner as to sensor comprises means for controlling Intensity of a focus of said lenslet.

8. The sensor of claim 7 wherein said sensor comprises means for performing one or more tasks selected from the group consisting of improving signal-to-noise ratio and changing an effective f-number of said lenslet.

9. The sensor of claim 7 wherein said sensor comprises means for apodizing illumination of said lenslet to control aberration content of a beam from said lenslet.

10. An adaptive dynamic wavefront sensor comprising:
    a polarizer;
    pupil relay lenses;
    a lenslet array;
    a spatial light intensity modulator comprising a sub-array of pixels which control the illumination of a lenslet of said lenslet array;
    a CCD camera receiving light from said lenslet array; and
    a polarizing beam splitter receiving incoming light from said polarizer on one side and from said spatial light intensity modulator on another side and sending light to said spatial light intensity modulator on one side and to said lenslet array through said pupil relay lenses on another side.

11. An adaptive dynamic wavefront sensing method comprising the steps of:
    receiving light and outputting light with a spatial light intensity modulator; and
    providing light output from the spatial light intensity modulator to a lenslet array;
    wherein a sub-array of pixels control the illumination of a lenslet of said lenslet array.

12. The method of claim 11 wherein in the receiving and outputting step a sub-array of pixels of the spatial light intensity modulator controls illumination of a lenslet of the lenslet array.

13. The method of claim 12 wherein in the receiving and outputting step the sub-array operates as a shutter for the lenslet.

14. The method of claim 13 wherein in the receiving and outputting step the spatial light intensity modulator selectively illuminates a subset of all lenslets of the lenslet array.

15. The method of claim 14 additionally comprising the step increasing dynamic range by allowing each lenslet focus to occupy unambiguously a larger area of a detection device, thereby permitting measurement of a larger wavefront tilt.

16. The method of claim 14 additionally comprising the step of sampling a wavefront at a variable density of points and frequencies to adaptively determine an optimal scan rate and scan configurations.

17. The method of claim 14 wherein the sensor is adaptively operated such that additionally comprising the step of adaptively changing temporal frequency to quantify vibration amplitudes and modes.

18. The method of claim 12 wherein the receiving and outputting steps comprise operating the sub-array to control intensity of a focus of the lenslet.

19. The method of claim 18 wherein the receiving and outputting steps comprise operating the sub-array to perform one or more steps selected from the group consisting of improving signal-to-noise ratio and changing an effective f-number of the lenslet.

20. The method of claim 18 wherein the receiving and outputting steps comprise operating the sub-array to apodize illumination of the lenslet to control aberration content of a beam from the lenslet.

21. An adaptive dynamic wavefront sensing method comprising the steps of:
    passing light through a polarizer;
    with a polarizing beam splitter, receiving incoming light from the polarizer on one side and from a spatial light intensity modulator on another side and sending light to the spatial light intensity modulator on one side and to a lenslet array through pupil relay lenses on another side; and
    receiving light from the lenslet array with a CCD camera;
    wherein a sub-array of pixels of said spatial tight intensity modulator controls illumination of a lenslet of said lenslet array.

* * * * *